(12) United States Patent
Degawa et al.

(10) Patent No.: US 6,402,995 B1
(45) Date of Patent: Jun. 11, 2002

(54) PROCESS FOR PREPARING POLYVINYL ALCOHOL CONTACT LENSES

(75) Inventors: Hiroki Degawa; Yuki Ikeda; Kenji Uno, all of Bunkyo (JP)

(73) Assignee: Seed Co., Ltd., Tokyo (JP)

( * ) Notice: Subject to any disclaimer, the term of this patent is extended or adjusted under 35 U.S.C. 154(b) by 0 days.

(21) Appl. No.: 09/463,835

(22) PCT Filed: Jul. 8, 1998

(86) PCT No.: PCT/JP98/03084

§ 371 (c)(1),
(2), (4) Date: Jan. 28, 2000

(87) PCT Pub. No.: WO99/06199

PCT Pub. Date: Feb. 11, 1999

(30) Foreign Application Priority Data

Jul. 31, 1997 (JP) .............................................. 9-205853

(51) Int. Cl.$^7$ ............................................... B29D 11/00

(52) U.S. Cl. ....................................... 264/1.38; 264/2.6

(58) Field of Search ................................. 264/1.1, 1.36, 264/1.38, 2.6

(56) References Cited

U.S. PATENT DOCUMENTS 5,028,358 A * 7/1991 Blum ......................... 264/1.38
5,789,464 A * 8/1998 Muller ........................ 264/1.1

FOREIGN PATENT DOCUMENTS

| JP | 01-250923 A | 10/1989 |
| JP | 09-40720 A | 2/1997 |
| JP | 09-43547 A | 2/1997 |

* cited by examiner

Primary Examiner—Mathieu D. Vargot
(74) Attorney, Agent, or Firm—Pitney, Hardin, Kipp & Szuch LLP

(57) ABSTRACT

A process for preparing crosslinked polyvinyl alcohol contact lenses through hydrolysis of a copolymer of a vinyl ester with triallyl isocyanurate, which includes preparing a mixture of 100 parts by weight of the vinyl ester with 0.05 to 5 parts by weight of the triallyl isocyanurate, filling a mold composed of a male mold and a female mold with the mixture, applying ultraviolet ray to form a lens-shaped polymer, and hydrolyzing the resultant polymer. Since this process has a lens-shaped polymer formed without machinery processings, the lens surface is not roughened and the shape stability of the completed lens in a swollen state is so good that the handleability thereof is good and the lens can be mass-prepared with equalized quality.

5 Claims, No Drawings

PROCESS FOR PREPARING POLYVINYL ALCOHOL CONTACT LENSES

FIELD OF THE INVENTION

This invention relates to a process for preparing contact lenses and more specifically a novel process for preparing contact lenses made of crosslinked polyvinyl alcohol.

BACKGROUND OF THE INVENTION

Generally, polyvinyl alcohol is obtained by hydrolyzing a polyvinyl ester such as polyvinyl acetate, and it is not easy to crosslink the polyvinyl alcohol.

Up to this time, the crosslinking of polyvinyl alcohol is performed by a way of hydrolyzing polyvinyl acetate to produce polyvinyl alcohol, followed by crosslinking polyvinyl alcohol by using an aldehyde and so on. However, with this method it is not easy to control severely a degree of the crosslinking of polyvinyl alcohol.

Also, a contact lens made of polyvinyl alcohol as a material could not attain to be practical, because it is difficult to shape polyvinyl alcohol into a lens due to its peculiar properties.

On the contrary, Japanese Patent Laid Open No. Hei 40719/1997 discloses a crosslinked polyvinyl alcohol contact lens obtained by processing a copolymer consisting of vinyl acetate and triallyl isocyanurate to form a lenslike copolymer under cooling, followed by hydrolyzing the resultant polymer.

In Japanese Patent Laid Open No. Hei 40719/1997, triallyl isocyanurate as a crosslinking agent and vinyl acetate are bulk-polymerized in a test tube, then the copolymer is subject to machinery processings by grinding and polishing under cooling to form a lens-shaped polymer, followed by hydrolyzing and the lens-shaped polymer obtained is usufull as a crosslinked polyvinyl alcohol contact lens having a high moisture content.

However, it is difficult to handle vinyl acetate having a comparatively small specific gravity and easy vaporization and it is not easy to cotrol a polymerization of the vinyl acetate with triallyl isocyanurate having a comparatively large specific gravity and difficult vaporization due to a thermal polymerization method in a test tube. That is to say, in the case of cutting out several lenses from one piece of a stick-shaped bulky polymer, the lens in a swollen state has a variety of shapes and a shape stability so that there is caused a difficulty of obtaining lenses with equalized quality.

Furthermore, since vinyl acetate copolymer of enough hardness could not be obtained at normal temperature, machinery-processings under cooling are required and thus, the preparing steps becomes complicated to maintain the processing conditions and therefore, it is difficult to mass-produce lenses successively at a low cost. Moreover, though the machinery-processings are carried out under cooling, a processing heat arising during the processings has a bad influence on the vinyl acetate copolymer, and as a result the lens surface is roughened and the lens could not be satisfied optically.

Then, the appearance of a process which could be operated easily, for preparing crosslinked polyvinyl alcohol contact lenses having a good shape stability has strongly been desired.

The present invention, meeting the above-mentioned needs, provides a practical and novel process for preparing crosslinked polyvinyl alcohol contact lenses. That is to say, the invention provides a process for preparing crosslinked polyvinyl alcohol contact lenses, which does not roughen the lens surface and can improve a handleability of the lens by improving a shape stability of the completed lens in a swollen state and can mass-produce the lens with equalized quality, as a result of permitting the polymerization can be carried out to a shape of lens without machinery processings.

DISCLOSURE OF THE INVENTION

A process for preparing crosslinked polyvinyl alcohol contact lenses of the present invention comprises preparing a mixture of 100 parts by weight of a vinyl ester expressed by the following structural formula (1)

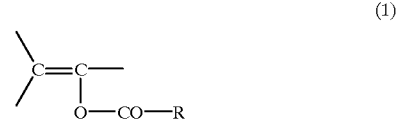

(1)

wherein R is a hydrocarbon group, and 0.05 to 5 parts by weight of triallyl isocyanurate, filling a mold composed of a male mold and a female mold with the mixture, applying ultraviolet ray to form a lens-shaped polymer, and hydrolyzing the resultant polymer.

In the process of the present invention, since the polymerization can be carried out to a shape of lens without machinery processings, the lens surface is not roughened and a shape stability of the completed lens in a swollen state is so excellent that the handleability thereof is good and the lens can be mass-produced with equalized quality.

In this process, since the lens-shaped polymers can be formed at the beginning of the process by the mold in a short time, it is considered that the triallyl isocyanurate can be effectively crosslink the polyvinyl ester for maintaining the shape of the lens.

BEST MODE OF EMBODIMENTS OF THE INVENTION

The present invention will be further described by way of preferable embodiments.

In the present invention, the vinyl ester which becomes a main component of polyvinyl alcohol is expressed by the structural formula (1) and the hydrocarbon group indicated by R is preferably an alkyl group of $C_1$ to $C_8$, an alkenyl group, a cycloalkyl group or an aryl group.

Instances of the alkyl group include methyl group, ethyl group, isopropyl group and hexyl group, instances of the alkenyl group include vinyl group, propenyl group, butenyl group and hexadienyl group, instances of the cycloalkyl group include cyclopentyl group and cyclohexyl group, and instances of the aryl group include phenyl group.

The vinyl ester is preferably vinyl acetate of which R is methyl group, and also vinyl acetate may be used in mixture with other vinyl esters of which R is the alkyl group of $C_1$ to $C_8$, the alkenyl group, the cycloalkyl group, and the aryl group for adjusting a polymerization rate, a monomer viscocity and a hydrolysis rate.

The case in which R is an alkyl group of exceeding $C_8$ is not preferable because the hydrolysis of the vinyl ester is apt to become difficult and there is a tendency that it is difficult to obtain the polyvinyl alcohol of saponification ratio of 80% or more.

Instances of the vinyl ester may include vinyl acetate, vinyl propionate, vinyl butyrate, vinyl pivalate, vinyl acrylate, vinyl methacrylate and vinyl sorbate.

When a content of triallyl isocyanurate as a crosslink component is less than 0.05 parts by weight, polyvinyl alcohol after the completion of hydrolyzing can not be crosslinked enoughly as a gel and thus, it is difficult to maintain the shape of contact lens. When the content is more than 5 parts by weight, a crosslinking density is so big that flexible contact lens can not be obtained and also the moisture content falls. Therefore, in the present invention, triallyl isocyanurate is used in a range from 0.05 to 5 parts by weight and preferably, from 0.06 to 2 parts by weight.

The molds used in the present invention are molds made of plastic such as polyethylene, polypropylene, polystyrene or ABS resin, or molds made of glass, or these molds in combination with a mold made of metal, which have an optically high precision. Further, since the vinyl ester of which R has a small carbon number such as vinyl acetate is easy to vaporize, it is necessary to pay the greatest care upon air-tightness.

The polymerizing method is a radical polymerization by ultraviolet ray irradiation. In the thermal polymerization method using the mold, when a vinyl ester such as vinyl acetate is vaporized at the beginning of the polymerization, and in the case that the mold has a high air-tightness and an inner pressure of the mold is too high, explosion occurs under certain circumstances. In this point, the polymerization by ultraviolet ray can control easily the polymerization heat compared with the thermal polymerization.

In the present invention, it is also important to control the polymerization reaction by ultraviolet ray in the mold. That is to say, as for the polymerization in the mold and using a small quantity of monomers, it is required to adjust strictly a polymerization reaction rate of the vinyl ester and a polymerization reaction rate of triallyl isocyanurate as the crosslinking agent. The above purpose may be attained by adjusting an irradiation exposure dose of ultraviolet ray corresponding to an amount of an ultraviolet ray polymerization initiator. That is to say, as for conditions of the polymerization reaction, in the case of not using an ultraviolet ray polymerization initiator, irradiation energy is preferably in the range from 30 to 300 mW/cm$^2$ and in the case of using the ultraviolet ray polymerization initiator in the range from about 5,000 to 25,000 ppm, irradiation energy is preferably in the range from 10 to 100 mW/cm$^2$.

The polymer obtained is cooled together with the mold to a temperature of softening point or less and the polymer is taken out of the mold.

Instances of the ultraviolet ray polymerization initiator include diethoxyacetophenone, 4-(2-hydroxyethoxy) phenyl-(2-hydroxy-2-propyl) ketone, 2-hydroxy-2-methyl-1-phenylpropane-1-one, 2-methyl-2-morpholino (4-thiomethylphenyl)propane-1-one, 1-hydroxycyclohexyl-phenylketone, 2-benzyl-2-dimethylamino-1-(4-morpholinophenyl)-butanone and benzyldimethylketal.

The lens-shaped vinyl ester copolymers polymerized in the mold become objective polyvinyl alcohol contact lenses by carrying out hydrolyzing.

Though the hydrolyzing method is not limited, the reaction is usually carried out by dipping the molded lens-shaped polymer into an alkaline solution. For instance, preferably, the molded lens is swollen previously by a lower alcohol such as methanol, and then hydrolyzed by dipping it into a mixed solution of a sodium hydroxide solution and a lower alcohol such as methanol. In this case, if the hydrolysis is not enoughly carried out, there is a tendency that a high moisture content which is a characteristic of the present invention is not obtained, and also the polymer is reduced in the transparency and thus, it is difficult to use as the contact lenses and therefore, a hydrolysis ratio is preferably 80% or more.

As mentioned above, according to the present invention, crosslinked polyvinyl alcohol contact lenses having the excellent flexibility, high moisture content and excellent shape stability and lens quality can be easily prepared.

The present invention is illustrated by the following examples.

EXAMPLE 1

To 20 g of vinyl acetate are 0.2 g of triallyl isocyanurate and 20,000 ppm of 2-hydroxy-2-methyl-1-phenylpropane-1-one (DAROCUR 1173: Trade name, available by CIBA-GEIGY(Japan) Limited) as an ultraviolet ray initiator added and stirred enoughly. Thereafter, the liquid mixture is charged into a mold made of polypropylene, followed by applying ultraviolet ray of irradiation energy of 15.3 mW/cm$^2$ by a high-pressure mercury lamp in an ultraviolet ray irradiation equipment for 30 minutes to obtain a lens-shaped polymer. Furthere, hydrolyzing is carried out by dipping the molded lens-shaped polymer into a solution which is obtained by mixing methanol and a distilled water in a ratio of 8:2 and further adding sodium hydroxide thereto to be a 1.0 molar concentration at 40° C. for 2 hours or more. Thereafter, the molded lens-shaped polymer is taken out and washed enoughly with a large quantity of water to obtain a crosslinked polyvinyl alcohol contact lens.

The molded lens-shaped polymer is confirmed by an infrared spectrophotometer that a saponification ratio of vinyl alcohol from a vinyl ester has progressed to 90% or more. The lens has the transparency of ray transmittance of 95% or more and the moisture content of 84%; the roughness of the lens surfaces is not observed; the shape stability of the completed lens in a swollen state is excellent; the handleability of the lens is good; and the lens quality is excellent.

EXAMPLE 2

Except that 18 g of vinyl acetate, 2 g of vinyl propionate, 0.2 g of triallyl isocyanurate and 20,000 ppm of the ultraviolet ray polymerization initiator (DAROCUR 1173: CIBA-GEIGY(Japan) Limited) are added, the procedure is carried out in the same manner as described in Example 1 to obtain crosslinked polyvinyl alcohol contact lens. The molded lens-shaped polymer is confirmed by the infrared spectrophotometer that the saponification ratio of vinyl alcohol from a vinyl ester has progressed to 90% or more. The lens has the transparency of ray transmittance of 95% or more and the moisture content of 76%; the roughness of the lens surface is not observed; the shape stability of the completed lens in a swollen state is excellent; the handleability of the lens is good; and the lens quality is excellent.

EXAMPLE 3

With 20 g of vinyl acetate are 0.2 g of triallyl isocyanurate mixed and stirred enoughly. Thereafter, the liquid mixture is charged into a mold made of polypropylene, followed by applying ultraviolet ray of irradiation energy of 107 mW/cm$^2$ by the high-pressure mercury lamp in the ultraviolet ray irradiation equipment for 10 minutes in the absence of an ultraviolet ray polymerization initiator to obtain a lens-shaped polymer. Furthere, the produce is carried out in the same manner as described in Example 1 to obtain a crosslinked polyvinyl alcohol contact lens.

The molded lens-shaped polymer is confirmed by the infrared spectrophotometer that the saponification ratio of vinyl alcohol from a vinyl ester has progressed to 90% or more. The lens has the transparency of ray transmittance of 95% or more and the moisture content of 78%; the roughness of the lens surface is not observed; the shape stability of the completed lens in a swollen state is excellent; the handleability of the lens is good; and the lens quality is excellent.

Comparable Example 1

A liquid mixture consisting of 99 g of vinyl acetate, 1 g of triallyl isocyanurate and 0.5 g of lauryl peroxide is charged into a test tube and is subject to a thermal-polymerization to obtain one piece of stick-shaped polymer and then, using the stick-shaped polymer, ten pieces of molded lens-shaped polymer are obtained under cooling. Since the surface of each lens is roughened, each lens is not satisfied as an optical material. Also, the ten pieces of lenses in a swollen state have a variety of shapes and can not maintain the shape as lens.

APPLICABILITY FOR INDUSTRIAL USE

Lenses obtained by the process of the present invention are useful as crosslinked polyvinyl alcohol contact lenses having a high moisture content.

According to the present invention, since crosslinked polyvinyl alcohol contact lenses having the high transparency and high moisture content are obtained by forming a lens-shaped polymer in a mold under controled polymerization condition in a short time, the roughness of the lens surface is not observed and the shape stability of the completed lens in a swollen state is so good that the handleability thereof is good and practically useful, and further the lens can be mass-prepared with equalized quality.

What we claim is:

1. A process for preparing crosslinked polyvinyl alcohol contact lenses through hydrolysis of a copolymer of a vinyl ester expressed by the following structural formula (1)

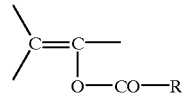

(1)

wherein R is a hydrocarbon group, and triallyl isocyanurate, which comprises preparing a mixture of 100 parts by weight of said vinyl ester and 0.05 to 5 parts by weight of said triallyl isocyanurate, filling a mold composed of a male mold and a female mold with said mixture, applying ultraviolet ray to form a lens-shaped polymer, and hydrolyzing the resultant polymer.

2. The process according to claim 1, wherein said hydrocarbon group is an alkyl group of $C_1$ to $C_8$, an alkenyl group, a cycloalkyl group or an aryl group.

3. The process according to claim 1, wherein said vinyl ester is a mixture of two or more vinyl esters.

4. The process according to claim 1, wherein the ultraviolet ray polymerization is carried out under an irradiation condition of from 30 to 300 mW/cm$^2$ in the absence of a polymerization initiator.

5. The process according to claim 1, wherein the ultraviolet ray polymerization is carried out under an irradiation condition of from 10 to 100 mW/cm$^2$ in the presence of a polymerization initiator.

* * * * *

UNITED STATES PATENT AND TRADEMARK OFFICE
CERTIFICATE OF CORRECTION

PATENT NO. : 6,402,995 B1
DATED : June 11, 2002
INVENTOR(S) : Degawa et al.

It is certified that error appears in the above-identified patent and that said Letters Patent is hereby corrected as shown below:

<u>Title page,</u>
Item [22], PCT Filed: change "Jul. 8, 1998" to -- Jul. 9, 1998 --

Signed and Sealed this

Fifteenth Day of October, 2002

*Attest:*

*Attesting Officer*

JAMES E. ROGAN
*Director of the United States Patent and Trademark Office*